April 18, 1950
A. MULLER
2,504,867
METHOD OF ARC WELDING
Filed June 22, 1948
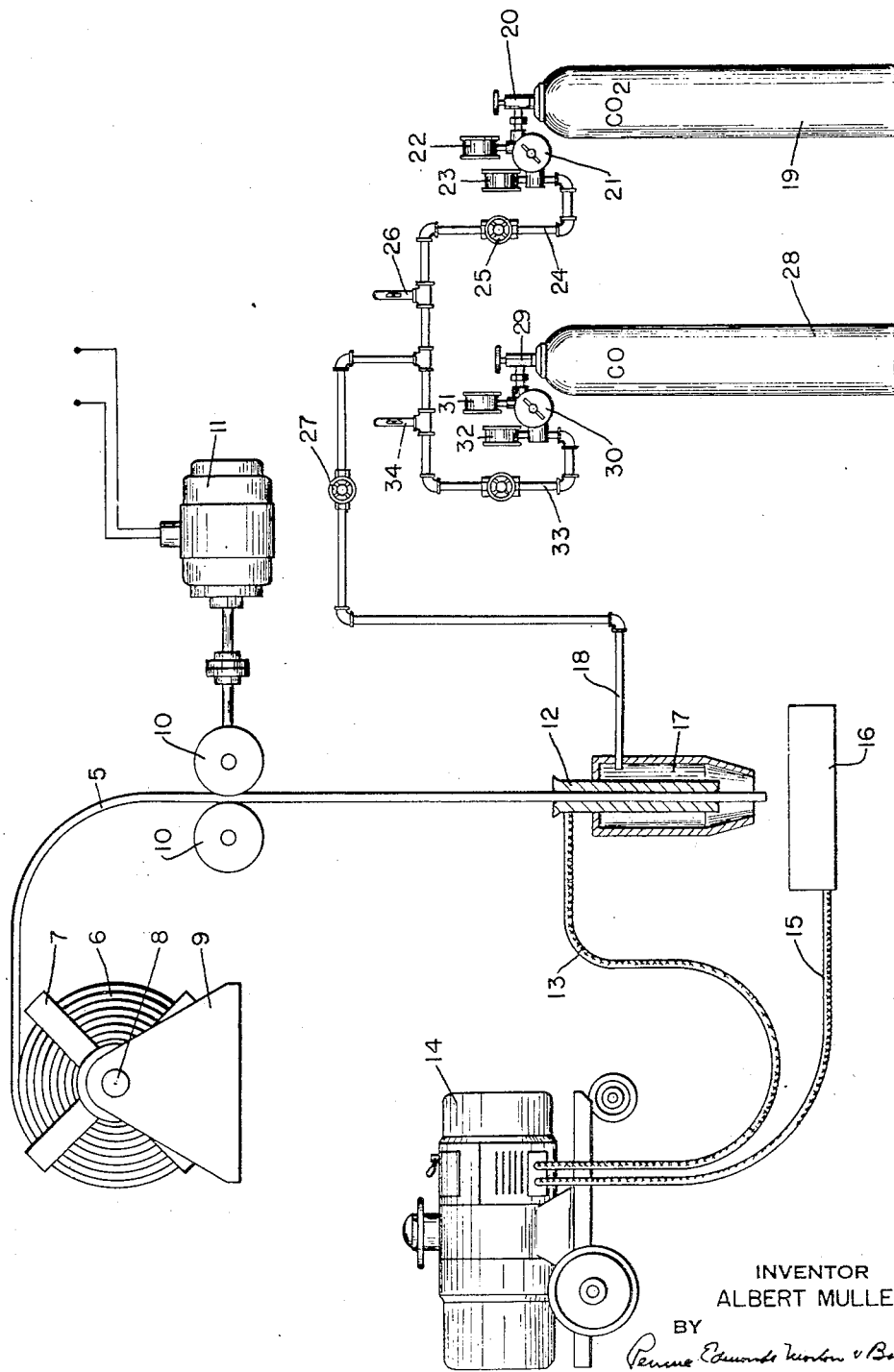
INVENTOR
ALBERT MULLER
BY
Pennie Edmonds Morton & Barrows
ATTORNEYS Patented Apr. 18, 1950

2,504,867

UNITED STATES PATENT OFFICE 2,504,867

METHOD OF ARC WELDING

Albert Muller, Brooklyn, N. Y., assignor to Air Reduction Company, Incorporated, New York, N. Y., a corporation of New York Application June 22, 1948, Serial No. 34,472

4 Claims. (Cl. 219—10)

This invention relates to electric arc welding and more particularly to improvements in gas shielded arc welding with continuously fed bare or lightly coated electrode wire.

Welds produced by striking an arc between a consuming electrode and the workpiece when the arc is not shielded from the atmosphere are generally unsatisfactory because of the porosity and lack of ductility of the metal deposited in the weld. For that reason, welding methods have been developed in which the welding rod is heavily coated with a flux which decomposes to produce a shielding gaseous atmosphere or a covering of molten material to protect the weld. While useful for many purposes, the heavily coated electrode is not readily adaptable to continuous feeding, since difficulty is experienced in transmitting the electric current to the electrode. Hence the method is normally limited to the use of stick electrodes.

Another method involves the use of rare gases of the atmosphere which are fed to and form a protecting shield about the arc and the adjacent workpiece. The rare gases are relatively expensive and not well adapted for use in low cost welding jobs.

It is the object of the present invention to provide a gas shielding atmosphere which is inexpensive, provides good arc characteristics, and produces sound, ductile welds, free from porosity, with ferrous and non-ferrous metals.

Other objects and advantages of the invention will be apparent as it is better understood by reference to the following specification and the accompanying drawing, wherein the single figure illustrates diagrammatically an apparatus suitable for the practice of the present invention.

In accordance with the invention, a bare electrode wire or one having a light or wash coating, as distinguished from heavy coatings of fluxing materials, is fed continuously from a source to a current pickup shoe, and an arc is struck between the end of the electrode and the workpiece. A gaseous atmosphere is supplied and delivered to a point where it surrounds the arc and blankets the workpiece so that the weld is protected from the atmosphere. The shielding atmosphere, in accordance with the present invention, consists of a mixture of carbon dioxide and carbon monoxide in suitable proportions to effect the desired result.

Referring to the drawing, 5 indicates the electrode wire which is withdrawn continuously from a coil 6 on a reel 7 pivoted at 8 on a support 9 by rollers 10 driven by a motor 11. The speed of the motor may be controlled in any suitable manner to feed the electrode wire 5 at the desired rate. As indicated, the wire may be bare or it may have a light or wash coating, usually of a thickness of .001 to .004 inch. Such a coating does not affect the transmission of current to the electrode as it passes through the current pickup shoe 12. The current pickup shoe is connected by a conductor 13 to a welding machine 14 which is adapted to supply suitable current for the purpose. The welding machine 14 is connected by a conductor 15 to the workpiece 16 which may be a ferrous or non-ferrous metal. In the operation, an arc is struck between the end of the electrode wire 5 and the workpiece in order to effect the weld.

The pickup shoe 12 and the end of the electrode wire 5 are surrounded by a chamber 17 to which the gaseous atmosphere is delivered through a pipe 18. The gaseous atmosphere is delivered at the mouth of the chamber 17 about the end of the electrode wire 5 and blankets the weld, which is thus shielded from the atmosphere.

To provide the shielding atmosphere, carbon dioxide may be supplied from a cylinder or other source 19 through a valve 20 and pressure regulator 21 which reduces the pressure of the gas to the desired point. Pressure indicators 22 and 23 indicate the pressure of the gas before and after it passes through the regulator 21. The gas is delivered through a pipe 24 controlled by a valve 25 to a flow meter 26 and thence to the pipe 18, controlled by a valve 27.

Carbon monoxide is supplied from a cylinder 28 or other suitable source and delivered through a valve 29 and pressure-reducing valve 30. Pressure indicators 31 and 32 indicate the pressure before and after the gas passes through the regulator 30. Thence the gas is delivered through a pipe 33 to a flow meter 34 and to the pipe 18 where it mingles with the carbon dioxide from the cylinder 19. Thus, the two gases may be delivered in any desired proportion to maintain the operation.

It has long been recognized that carbon monoxide affords a good reducing atmosphere to protect a weld from oxidation, but a welding arc in a pure carbon monoxide atmosphere is relatively unstable. It has also been suggested that carbon dioxide may be used as a shielding gas in arc welding, but it has been considered heretofore undesirable to use carbon dioxide because, at the temperature of the arc, carbon dioxide breaks down, releasing oxygen, and the resulting weld is generally porous. I have discovered that the combination of carbon dioxide and carbon monoxide, especially in the proportions as hereinafter described, affords a satisfactory shield for the arc and produces sound welds, free from porosity. The combination of the two gases produces a result which could not be anticipated from the known characteristics of the gases when used separately as a shield for the arc.

For practical use in most cases, I have found that a combination of 85% of carbon monoxide and 15% of carbon dioxide produces the most satisfactory arc shielding atmosphere. However, it is possible to increase the amount of carbon dioxide. For example, it has been found that sound welds are obtained in an atmosphere containing not more than 30% of carbon dioxide with a balance of carbon monoxide, using a 2% manganese steel electrode wire on a semi-killed baseplate steel. Satisfactory welds have been made with rimmed steel or low carbon killed steel electrode wire, with as much as 50% of carbon dioxide and the balance of carbon monoxide. I prefer to use not more than 30% of carbon dioxide mixed with carbon monoxide, and lower percentages of carbon dioxide down to approximately 10% with a balance of carbon monoxide are characteristic of the invention as herein described. When the amount of carbon dioxide is maintained within that range, or with certain steels is not permitted to exceed 50%, there always will be sufficient carbon monoxide present in the gaseous mixture to offset any deleterious effect which otherwise would result from the presence of oxygen resulting from decomposition of the carbon dioxide.

Various changes may be mad in the procedure and the apparatus as described without departing from the invention or sacrificing the advantages thereof.

I claim:
1. The method of welding with an electric arc which comprises continuously feeding a metallic wire to a point adjacent the metallic material to be welded, supplying current to and establishing an arc between the wire and the material, and delivering adjacent the arc, to form a gaseous shield thereabout, a gaseous mixture of substantially predetermined composition and consisting of from about 10% to 50% of carbon dioxide and from about 50% to 90% of carbon monoxide, the gases forming said mixture being obtained from at least one source extraneous from the arc.

2. The method of welding as set forth in claim 1 in which the amount of carbon dioxide in the gaseous mixture is from about 10% to 30%, and the amount of carbon monoxide therein is from about 70 to 90%.

3. The method of welding as set forth in claim 1 in which the gaseous mixture consists of approximately 15% of carbon dioxide and 85% of carbon monoxide.

4. The method of welding as set forth in claim 1 in which the gaseous mixture consists of approximately 50% of carbon dioxide and 50% of carbon monoxide.

ALBERT MULLER.

REFERENCES CITED

The following references are of record in the file of this patent:

UNITED STATES PATENTS

| Number | Name | Date |
|---|---|---|
| 1,519,007 | Paterson | Dec. 9, 1924 |
| 1,553,543 | Lincoln | Sept. 15, 1925 |
| 1,589,017 | Lincoln | June 15, 1925 |
| 1,749,765 | Hendrickson | Mar. 11, 1930 |
| 1,884,712 | Jerabek | Oct. 25, 1932 |
| 1,886,643 | Chapman | Nov. 8, 1932 |
| 2,043,960 | Jones et al. | June 9, 1936 |
| 2,053,417 | Brace | Sept. 8, 1936 |
| 2,065,157 | Stine | Dec. 22, 1936 |
| 2,121,693 | Henderson | June 21, 1938 |
| 2,241,572 | Armstrong | May 13, 1941 |